(12) United States Patent
Hutter et al.

(10) Patent No.: US 8,961,892 B2
(45) Date of Patent: *Feb. 24, 2015

(54) DEVICE FOR CARRYING OUT CHEMICAL REACTIONS UNDER HOMOGENOUS AND HETEROGENOUS CONDITIONS

(75) Inventors: Cédric Hutter, Zürich (CH); Francesco Mascarello, Allschwil (CH); Philipp Von Rohr Rudolf, Muttenz (CH); David Ruppen, Glis (CH)

(73) Assignee: DSM IP Assets B.V., Heerlen (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/376,434

(22) PCT Filed: Jun. 14, 2010

(86) PCT No.: PCT/EP2010/058296

§ 371 (c)(1),
(2), (4) Date: Dec. 6, 2011

(87) PCT Pub. No.: WO2010/142809

PCT Pub. Date: Dec. 16, 2010

(65) Prior Publication Data

US 2012/0077992 A1    Mar. 29, 2012

(30) Foreign Application Priority Data

Jun. 12, 2009   (EP) ..................................... 09162612

(51) Int. Cl.
*B01J 19/32*      (2006.01)
*B01F 5/04*       (2006.01)
*B01F 5/06*       (2006.01)
*B01F 15/06*      (2006.01)
(Continued)

(52) U.S. Cl.
CPC ............ *B01J 19/2415* (2013.01); *B01F 5/0451* (2013.01); *B01F 5/0691* (2013.01);
(Continued)

(58) Field of Classification Search
CPC ............ B01J 19/00; B01J 19/24; B01J 19/32;
B01J 20/30; B01J 20/32; B01J 2219/00;
B01J 2219/00781; B01J 2219/00819; B01J
2219/00849; B01J 2219/30; B01J 2219/304;
B01J 2219/30491; B01J 2219/32; B01J
2219/322; B01J 2219/32286; B01J
2219/32293
USPC ............ 422/129, 211, 222; 502/60, 100, 439,
502/527.24
See application file for complete search history.

(56) References Cited

U.S. PATENT DOCUMENTS 5,639,070 A      6/1997 Deckard
6,616,909 B1 *   9/2003 Tonkovich et al. ........ 423/648.1
(Continued)

FOREIGN PATENT DOCUMENTS

WO           01/12312         2/2001
WO           03/089130       10/2003
WO    WO 2009/138432 A1 *   11/2009

OTHER PUBLICATIONS

International Search Report for PCT/EP2010/058296 mailed Sep. 17, 2010.

*Primary Examiner* — Natasha Young
(74) *Attorney, Agent, or Firm* — Nixon & Vanderhye P.C.

(57) ABSTRACT

Devices for selective hydrogenation of azide and peroxide compounds include at least one porous element, for example a solid metallic structure positioned within a reaction tube of a tubular housing. The porous element includes a framework of interconnected elements establishing a plurality of shells respectively defining a plurality of hollow spaces of predetermined geometrical configuration. Each of the shells includes holes that fluid-connect adjacent ones of the spaces to thereby allow a cross-flow of the azide or peroxide compounds through the porous element.

14 Claims, 2 Drawing Sheets

(fig.2)

Figure 1:
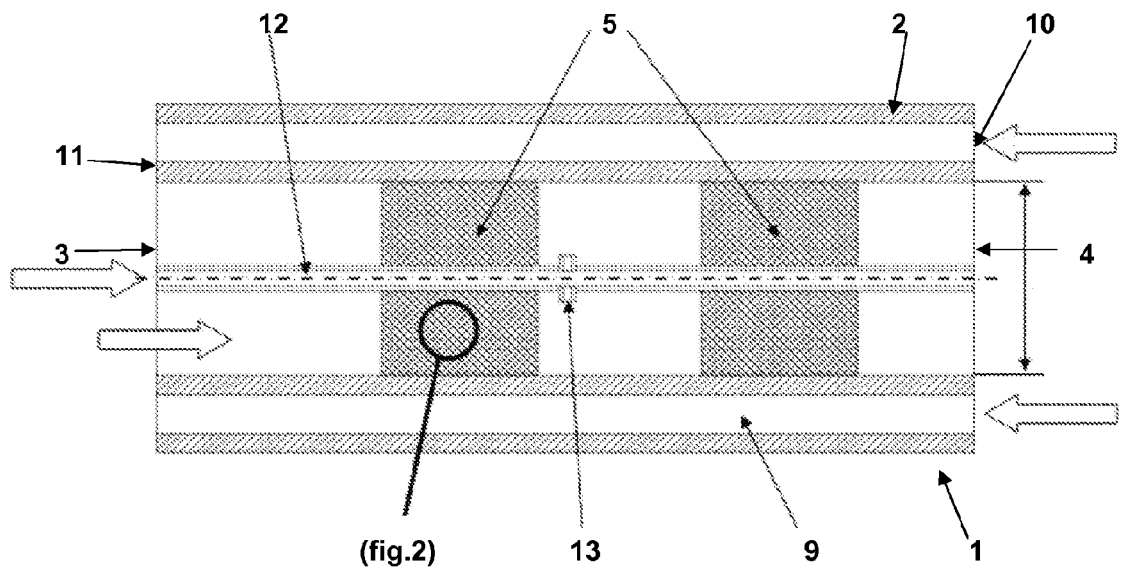

(51) Int. Cl.
*B01J 4/00* (2006.01)
*B01J 20/30* (2006.01)
*B01J 19/24* (2006.01)

(52) U.S. Cl.
CPC ............... *B01F15/065* (2013.01); *B01J 4/002* (2013.01); *B01J 19/2485* (2013.01); *B01J 2208/0084* (2013.01); *B01J 2219/00094* (2013.01); *Y10S 502/52724* (2013.01)
USPC ............. 422/222; 422/129; 422/211; 502/60; 502/100; 502/439; 502/527.24

(56) References Cited

U.S. PATENT DOCUMENTS

| | | |
|---|---|---|
| 2003/0031419 A1 | 2/2003 | Simmons et al. |
| 2004/0116288 A1* | 6/2004 | Dullien et al. ........... 502/527.11 |
| 2006/0245987 A1 | 11/2006 | Schmidt |
| 2007/0269356 A1 | 11/2007 | Mori et al. |
| 2007/0296106 A1* | 12/2007 | Munz et al. ..................... 264/49 |
| 2011/0097259 A1* | 4/2011 | Del-Gallo et al. ......... 423/648.1 |
| 2012/0080113 A1* | 4/2012 | Mascarello et al. ............ 138/40 |

* cited by examiner

DEVICE FOR CARRYING OUT CHEMICAL REACTIONS UNDER HOMOGENOUS AND HETEROGENOUS CONDITIONS

This application is the U.S. national phase of International Application No. PCT/EP2010/058296 filed 14 Jun. 2010 which designated the U.S. and claims priority to EP 09162612.7 filed 12 Jun. 2009, the entire contents of each of which are hereby incorporated by reference.

The present invention is related to the use of a device as described in detail hereinafter as a plug flow reactor in process routes for the chemical synthesis of vitamins, carotenoids and flavor & fragrance ingredients or intermediates thereof, especially for a continuous gas-, liquid, gas-liquid, solid-gas, solid-liquid and solid-liquid-gas reaction, as for example for selective hydrogenation of azides and peroxides.

The term "vitamins and carotenoids" embraces in the scope of the present invention water and fat-soluble vitamins, such as vitamin A, C, D, E, K and the vitamins of the B-family, and carotenoids such as, for example, beta-carotene, astaxanthin, apocarotenal, canthaxanthin, apoester, citranaxanthin, zeaxanthin, lutein and lycopene.

The device for carrying out chemical reactions under homogenous and heterogeneous conditions according to the invention comprising at least one porous element consisting of solid, for example metallic, structure which allows crossflow of the material through the porous element.

The device is designed for the continuous handling of single and multiphase chemical reactions, as for example fast, exothermic, mixing sensitive or temperature sensitive reactions. The device provides a fast mixing of reactants and an extremely enhanced heat transfer. The fixed connection of the porous structure to the wall of the reactor is of major importance to guarantee a good heat transfer and very high mechanical stability. This enables the possibility to process up to high temperatures and pressures. The structure of the porous element has also a strong influence on the axial dispersion, the residence time distribution in the reactor respectively, which is an important parameter for the scaling of chemical plants.

For conventional batch reactors, which are often used in chemical plants, the energy dissipation may be controlled by the rotational speed of the stirrer. For continuous systems only the flow rate can be changed which is directly linked to the residence time and its distribution. This correlation is a disadvantage compared to batch reactors, but can be handled by clearly defined geometry of the porous elements designed by the aid of Computational Fluid Dynamics (CFD) which are then manufactured, e.g. by the SLS method mentioned above.

Hydrogenation of functional groups in organic molecules are examples of fast multiphase, exothermic reactions. Such reactions are part of environmentally acceptable reaction routes available for organic synthesis. For example, the precursors, i.e. intermediates for Vitamin A and Vitamin E are produced by three major types of reactions. One among them is catalytic selective hydrogenation, a multiphase, i.e. three-phase reaction, in which the reaction mixture comprises a liquid phase, a non-dissolved solid catalytic phase and a gaseous phase.

The most common reactor type for carrying out such hydrogenation reactions is the batch wise operated slurry reactor. Mainly stirred tanks and loop reactors are in use. Due to the strong exothermic reaction, a combination of external and internal heat exchangers is necessary for efficient temperature control. In addition, the concentration of catalysts used in the reaction is relatively low (<10%), which limits the reaction rate. Finally, the heat transfer performance of conventional reactors is in the order of 0.2 to 5 kW m$^{-3}$ K$^{-1}$. Therefore, large reactor volumes are necessary to get acceptable production rates.

The performance of hydrogenation processes and the product distribution is strongly influenced by the catalyst activity/selectivity and the interaction of chemical kinetics with transport phenomena in the reactor.

In three phase reactions one of the main problems to overcome is avoiding internal and external mass transfer limitations. Therefore, catalyst particles of small diameter are required. In technical application the minimal size, however, is limited due to catalyst handling like solids charging, filtration and discharging that often pose safety and environmental problems, and can lead to significant catalyst losses and economically unfavorable processes.

Further, as hydrogenations are highly exothermic, the removal of the reaction heat becomes the main limitation for the reactor performance. Therefore, in a slurry reactor the mass of the catalyst per volume is limited by its heat exchange capacity.

A further aspect concerns process safety and sustainable production under controlled pressure. Product intermediates in a multi-step chemical process as described above are often unstable and decompose releasing a huge amount of heat. The consequences are thermal runaway and explosion.

To increase the safety of the chemical reactions a strict heat management is required. In addition, the amount of reactants in the reactor should be as small as possible to reduce the hazard potential.

These problems of selective reactions can be solved by using a device hereinafter also referred to as plug flow reactor, design as defined by the invention. Such a reactor may be operated in a continuous mode. This operational mode avoids the storage of large quantities of unstable product intermediates as in the case of batch processes and increases the safety of chemical reactions. This process integration is especially important to process thermal instable intermediates to stable ones.

The continuous plug flow reactor is optimized in its structured geometry in terms of heat and mass transfer. The plug flow like velocity field in the reactor guarantees an isothermal and homogeneous operating mode. It can be geometrically adapted to the heat transfer coefficients, viscosities, densities and the mixing behavior of the fluids used by the chemical reaction to optimize the ratio of operating expense (pressure drop, heating energy etc) and product quality (selectivity, conversion etc.). On the other hand, the structure of the at least one porous element fulfills not only the requirements of static mixing elements, it also acts as a flame arrestor for critical reactions and it permits mechanical and chemical stability of the continuous system through the convenient molding and the right choice of the material.

In particular, the device comprises a tube having a wall, preferably a cylindrical wall, with at least one inlet end and at least one outlet end, wherein in the tube at least one porous element consisting of a solid foamy structure is arranged, wherein the porous element comprises a plurality of hollow spaces that are connected to each other and form an interconnected network, and wherein the at least one element and the wall are made in one piece.

The device and the at least one porous element may be manufactured in one piece by Selective Laser Sintering (SLS) a method described for example in U.S. Pat. No. 5,639,070, U.S. Pat. No. 5,732,323 and U.S. Pat. No. 6,676,892 or by Electron Beam Melting (EBM).

EBM process has some advantages which are as follows:
No thermal treatment
Smoother surfaces available than via SLS
2-3 times faster than SLS Materials which can be used by this method in accordance with the present invention are Stainless steel, Titanium Ti6Al4V, Titanium Ti6Al4V ELI, Titanium Grade 2, Cobalt-Chrome, ASTM F75. Additional materials which can be used according to the present invention by EBM method are Titanium aluminide, Inconel (625 & 718), Stainless steel (e.g. 17-4), Tool steel (e.g. H13), Aluminium (e.g. 6061), Hard metals (e.g. NiWC), Copper (e.g. GRCop-84), Beryllium (e.g. AlBeMet), Amorphous metals, Niobium.

In a preferred embodiment of the invention, the porosity E of the at least one porous element is >0.5, preferably between 0.6 and 0.95, more preferably between 0.8 and 0.95. The porosity of the porous element describes the fraction of void space in the material. It is defined by the ration $V_V/V_T$, wherein $V_V$ is the volume of void-space and $V_T$ is the total occupied by the porous element in the device.

In accordance with a further embodiment of the device, the hollow spaces of the at least one porous element are substantially sphere-shaped and have an average equivalent diameter of 0.5 to 20 mm, preferably of 1 to 10 mm, more preferably of 1.5 to 5 mm.

The shell which defines the surface area of the sphere-shaped hollow spaces further comprises a plurality of interconnecting holes which allow cross flow of the material. The average equivalent diameter of said holes is in the range of 0.01 to 5 mm, preferably in the range of 0.1 to 5 mm, more preferably in the range of 0.1 to 2 mm.

In a particular embodiment of the invention, the shell is manufactured such that it comprises a smooth or rough or partially smooth and partially rough surface.

In accordance with the physical properties of the device, the tube and the at least one porous element are designed such that the Reynolds number Re for flow in the tubular pipe is in the range of 1 to 100,000. The Reynolds number Re is a dimensionless number that gives a measure of the ratio of inertial forces to viscous forces and, consequently, it quantifies the relative importance of these two types of forces for given flow conditions.

In another preferred embodiment of the invention, the preferably cylindrical wall and the at least one porous element are made from a metal selected from the group consisting of iron, titanium, zirconium, hafnium, vanadium, platinum, niob, rare earths and tantalum, or a metal alloy made from at least one of these metals which may comprise in its structure additional elements as carbon, silicium or other microelements.

In just another preferred embodiment of the invention, the preferably cylindrical wall and the at least one porous element are made from ceramic materials.

Examples of ceramic materials are aluminum oxide, silicon oxide, zirconium(IV) oxide, cordierite, steatite and/or carbon or silicon carbid.

Furthermore and dependent on the reaction which takes place in the tube, the porous element may stretch across the whole length of the tube or may have a length of 10 to 90%, preferably 50 to 80%, of the total length of the reactor tube.

A plug flow reactor according to the invention has characteristic dimensions in the millimeter range. Preferably, the reactor is used with channel diameters between 0.5 and 300 mm.

In a preferred embodiment of the invention, the reactor tube has a diameter which is in the range of from 1 to 300 mm, preferably from 2 to 100 mm, more preferably from 5 to 50 mm.

Another main feature of the reactor is the high surface to volume ratio compared to traditional chemical reactors. The specific surface of the reactor established by the at least one porous element lies in the range of 500 to 50,000 $m^2\,m^{-3}$, whereas the specific surface in typical laboratory and production vessels is about 10 $m^2\,m^{-3}$ and very seldom exceeds 100 $m^2\,m^{-3}$.

Depending on the required specific surface of the at least one porous element, the metallic shell comprises a smooth or rough or partially smooth and partially rough surface.

In a preferred embodiment of a plug flow reactor, the tube comprises a double-walled cylindrical housing defining an annular chamber, wherein said annular chamber includes at least one fluid inlet and at least one fluid outlet which are connected to a heat exchanger for continuously transporting a heat exchange fluid through said chamber for cooling or heating the reaction mixture.

Alternatively or in combination with the double walled cylindrical housing, the tube may comprises a central inner-tube arranged in longitudinal direction of the cylindrical wall, wherein said inner tube includes at least an outlet for adding a compound of the reaction process to the material transported through the tube or it is arranged with an inner tube without an outlet for transporting a heat exchange fluid through the reactor.

With regard to the use of the device as reactor to carry out chemical reactions, it is a fundamental object within the scope of the present invention to propose the use of catalysts. In plug flow reactors, catalyst particles can be used as in traditional suspension reactors in mobilized or immobilized form. If the catalyst particles are used in immobilized, the preferably sintered metallic structure of the porous element(s) can act as a support for the catalysts.

If the reactor is for example designed to carry out hydrogenation reactions, the catalyst is selected from the group consisting of Pt-catalysts, Pd-catalysts, Ni-catalysts and oxides of transition metals, as for example Pd, $Pd(OH)_2$, Pd/C, $Pd/BaSO_4$, $Pd/CaCO_3$, $Pd/Al_2O_3$, Pt, $PtO_2$, Ni, Raney Ni and Ru.

Various techniques are known for application of catalysts to structured supports and may be used to attach catalyst particles onto the surface of the metallic shell.

Thus EP-A 198,435 discloses the vapor deposition of catalytically active substances and promoters onto net-like or woven supports. Catalyst packs for the detoxication of exhaust gas are prepared from these vacuum-metallized support materials.

EP-A 564,830 teaches the production of catalyst packs, known as monoliths, by tempering a metallic support material in air, cooling, coating the support material with active components and promoters by vapor deposition in vacuo followed by cutting, shaping and processing to form monoliths.

EP-A 412,415 teaches the vapor deposition of palladium and a metallic inhibitor to a structured support and also the use of the thus prepared catalysts for the hydrogenation of triple bonds to double bonds, eg hydrodehydrolinalool to hydrolinalool.

By the use of vapor deposition it is possible to apply the active composition to the support materials, very uniformly and normally without the formation of agglomerates of undesirable magnitude, in the form of firmly adhering fine particles, which method is, however, relatively time-consuming and technically elaborate, particularly when relatively large amounts of active composition are to be applied. The vapor deposition must be carried out in vacuo, which requires a batch process involving comparatively long set-up times, or high vacuum pump capacities in continuous plants. There has thus been no lack of attempts to prepare the active composition by the impregnating process well known to the person skilled in the art from the manufacture of catalysts on bulk supports in particulate form. For this purpose a so-called "wash coat" is frequently applied to a pre-formed monolith, this being a coating composed of a finely divided oxidic catalyst-supporting powder, which is in turn coated with catalytically active substances. This mostly takes place by impregnation of the monolith with a suspension which contains the oxidic powders already provided with active composition, or the oxidic powders and precursors of the active composition, drying and, where applicable, conversion of the precursors to the active composition. Conventional processes for the application of wash coats are disclosed eg in DE-A 4,135,055 and DE-A 3,915,685. U.S. Pat. No. 4,746,537 discloses a process for coating a ceramic monolith with [gamma]-aluminum oxide precipitated in situ from the vapor phase. The monolith thus coated with finely divided alumina is then impregnated with a solution of salts of catalytically active metals, dried and calcined.

EP-A 56,435 teaches a continuous process in which metallic webs are passed through a dip bath, in which they are coated with an adhesive resistant to high temperature, eg a ceramic adhesive, and are then coated with a granular support material for the catalytically active substances. The substances deposited in the dip bath are then dried and the metallic web is fabricated to form monoliths.

Another impregnating process which can be applied to devices according to the present inventions is disclosed in EP 0 965 384. It can be summarized as follows:

The supports, i.e. the shell of the device according to the invention is impregnated with an impregnating medium which contains the active composition, its constituents, the precursors of the active composition and/or the precursors of said constituents. If the impregnating medium contains precursor compounds, these are converted during further processing to form the active composition. Normally, the active composition, its constituents, the precursors of the active composition and/or the precursors of said constituents are dissolved and/or suspended in a solvent or suspending agent, but it is equally possible to carry out the process without solvents or suspending agents, eg by using a liquid precursor of the active composition which has the required surface tension.

A solvent or suspending agent present in the impregnating medium is selected such that the active composition that is to be applied, its components and/or its/their precursors undergo no undesirable reactions in or with said solvent or suspending agent; further criteria for selection are cost and ease of handling. Suitable solvents or suspending agents are well-known and industrially commonly used solvents, eg aromatic or aliphatic hydrocarbons such as benzene, toluene, xylene, cumene, pentane, hexane, heptane, hydrocarbon cuts such as benzin, ligroin, petroleum white oil, alcohols, diols, polyalcohols such as methanol, ethanol, the two propanol isomers, the four butanol isomers, glycol, glycerol, ethers such as diethyl ether, di-n-butyl ether, methyl-tert-butyl ether, ethyl-tert-butyl ether, methyl-tert-amyl ether, ethyl-tert-amyl ether, diphenyl ether, ethyleneglycoldimethyl ether, diethyleneglycoldimethyl ether, triethyleneglycoldimethyl ether, or water. The organic solvents or suspending agents used may be substituted, if desired, eg with halogens, as in chlorobenzene, or with nitro groups, as in nitrobenzene. The solvents or suspending agents are used individually or intermixed.

In a preferred embodiment the solvent or suspending agent used is water.

The active composition, its constituents, the precursors thereof and/or the constituents thereof are suspended and/or dissolved in the solvents or suspending agents. In the simplest case, the active composition or the constituents thereof is/are dissolved and/or suspended in a solvent or suspending agent. For example, soluble active compositions or the soluble components thereof are dissolved in a solvent, or finely powdered, insoluble active compositions or the individual components thereof are suspended in a suspending agent. Alternatively, precursors cursors of the active composition or the constituents thereof are dissolved and/or suspended in a solvent or suspending agent. Precursors are converted to the final active composition during further processing. It is equally possible to use, in the impregnating medium, part of the active composition in the form of precursors and part as finished components of the active composition.

The impregnating medium additionally contains, if necessary, auxiliary substances. For example, the impregnating medium contains acid-reacting or alkaline-reacting compounds or buffers, if they are necessary or advantageous for stabilizing or solubilizing the active composition or at least one of the components or precursors thereof or their precursors present in the medium.

Preferably soluble salts of the components of the active composition are completely dissolved in a solvent. Advantageously, there is used an aqueous solution of components of the active composition.

If the active composition consists of metals, it is particularly preferred to use either an aqueous nitric-acid solution of nitrates of the metals or an aqueous ammoniacal solution of amine complexes of the metals. If the active composition consists of amorphous metal oxides, use is preferably made of an aqueous sol of the oxide, which sol may be stabilized.

The active composition is selected according to its end use; suitable active compositions for the various areas of application are known to the person skilled in the art. For the removal of nitrogen oxides from burner gases there are used eg pulverulent active compositions containing titanium(IV) oxide and vanadium oxide. For hydrogenating reactions there are used mostly metals as the active composition, frequently Group 8b metals, eg iron, cobalt, nickel, ruthenium, rhodium, platinum, palladium and/or iridium, which are optionally doped with other metals acting as promoters, eg alkali metals and/or alkaline earth metals such as lithium, sodium, potassium, rubidium, cesium, magnesium, calcium, strontium and barium, coinage metals such as copper, silver and/or gold, zinc, tin, bismuth, antimony, molybdenum, tungsten, and/or contain other promoters such as sulfur and/or selenium.

The structured support is impregnated with the impregnating medium in known manner. For this purpose the structured support is either dipped in the impregnating medium or washed or sprayed therewith.

The impregnated support is usually dried in known manner following impregnation, in order to free it from solvent or suspending agent. This is generally carried out by heating the impregnated support, in order to evaporate the solvent or suspending agent. Simultaneously or instead, a vacuum can be applied. In the case of impregnation with aqueous solutions and/or suspensions it is generally sufficient to heat the support to at least 100° C. to approximately 120° C.

Following drying, or concurrently with drying in a single step, precursor compounds which can be thermally decomposed to the active composition, are thermally decomposed to the active composition ("calcined") in known manner. To this end, the impregnated and optionally dried support is heated to an adequate temperature. The temperature suitable for this purpose is determined by routine tests. Generally, temperatures in the range of from 120° C. to 650° C. are sufficient, and usually temperatures in the range of from 120° C. to 400° C. are adequate.

The temperature may be attained in any type of oven or by using unenclosed radiators. It should in each case be set such that the material of the support remains stable at the temperature used. In the case of plastics materials there is therefore automatically an upper limit to the temperature which can be used, this being dependent on the plastics material itself, conforming to its maximum temperature resistance as given in data sheets or compiled tables for the plastics material concerned.

Precursor compounds which cannot be thermally decomposed to the active composition are, instead of thermal decomposition, converted to the active composition by suitable chemical treatment, concurrently with, or subsequently to, said heat treatment. For example, metal nitrates are decomposed during said heat treatment generally to oxides, which, normally following the heat treatment, undergo reduction by treatment with a reducing agent for the metal. The metal oxide in the finished monolith is reduced in simple manner to the metal with hydrogen or a hydrogen-containing gas mixture before the monolith is used as catalyst in the reactor.

During the drying procedure, the solvent or suspending agent used substantially evaporates, whilst during calcination and/or chemical after-treatment the final active composition is produced from precursors of the active composition, components thereof and/or precursors of said components.

A two-dimensional support substantially structured as a supporting web is shaped in known manner, usually following the heat treatment, to a three-dimensional entity appropriate to its end use. Shaping takes place eg in separate steps such as trimming, corrugation of the web, arranging and fixing the corrugated webs to form a monolith having parallel or crisscross channels. Shaping of the web to form a monolith may be carried out, if desired, prior to impregnation, drying, heat treatment or chemical treatment.

The impregnating process of the invention is carried out continuously or batchwise.

Figure 2A:
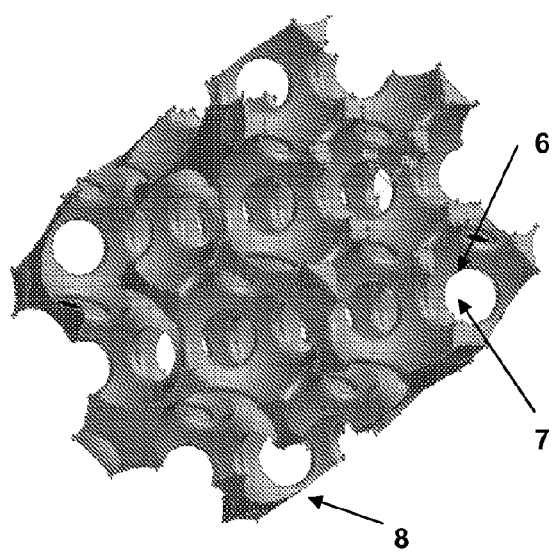
Figure 2B:
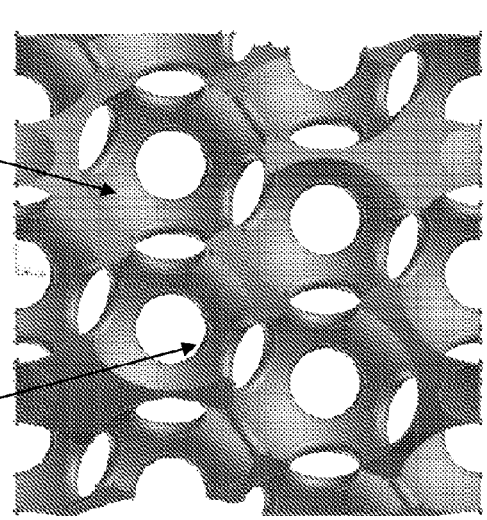
Figure 3:
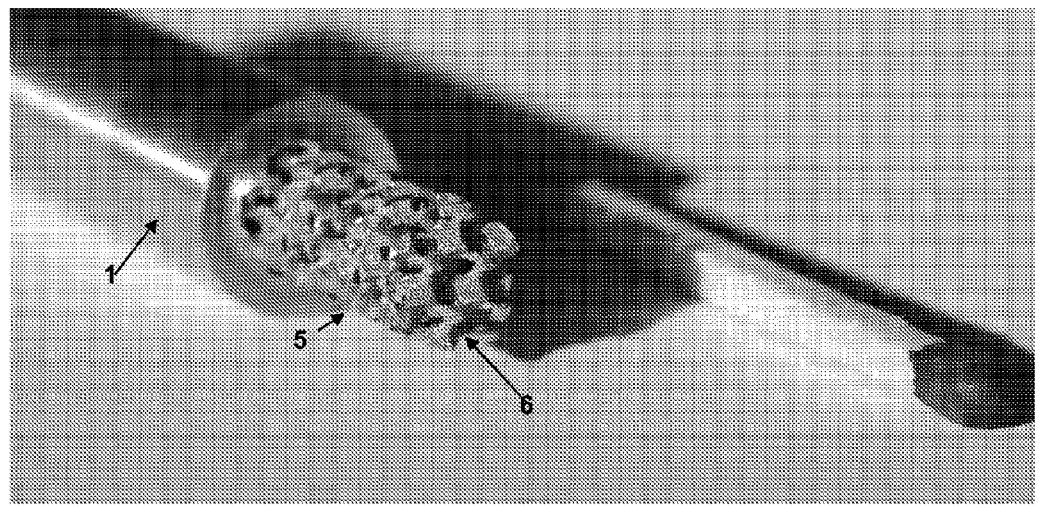
Figure 4:
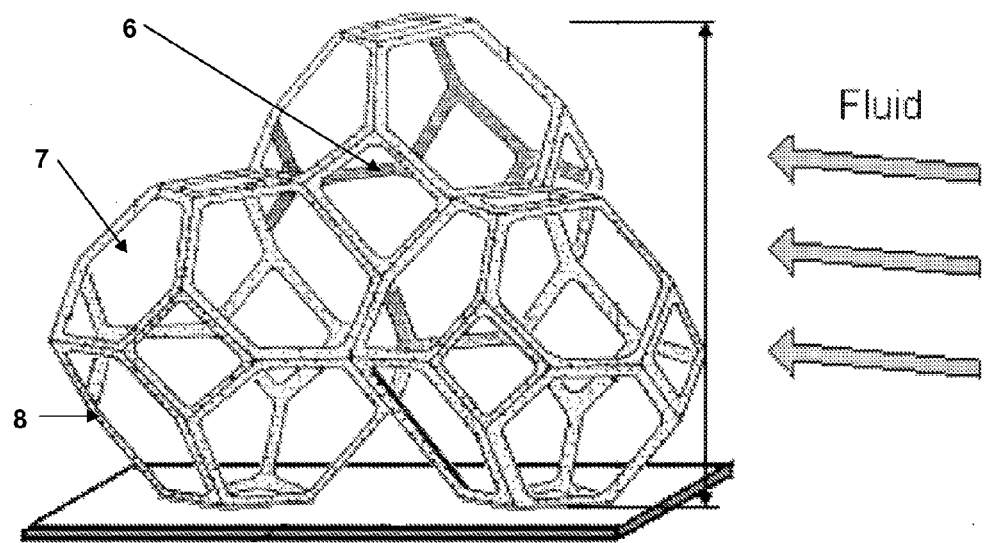

In the following, the invention will be described in more detail and in connection with the accompanying figures wherein, FIG. 1 shows a schematic view of a reactor in accordance with the present invention with two porous elements, FIGS. 2a and 2b show a CAD (Computer assisted design) view of the foamy structure of the porous elements and FIG. 3 shows a photographic picture of a preferred plug flow pipe useful for carrying out chemical reactions manufactured by SLS technology, wherein an un-detachably connected porous element is dissected out from the pipe wall, for the sake of better demonstration of the construction principle, and FIG. 4 shows an alternative sketch of hollow chambers of the porous elements.

1. BASIC STRUCTURE OF A PLUG FLOW REACTOR ACCORDING TO THE INVENTION

FIG. 1 is an exemplary cross sectional schematic view of a reactor in accordance with the present invention having two porous elements disposed therein. The reactor comprises a tube 1 having a cylindrical housing 2 with one inlet end 3 and one outlet end 4. Arranged in the tube 1 are two cylindrical porous elements 5 consisting of solid metal structure, wherein said porous elements 5 comprise—as shown in FIGS. 2a, 2b and 3—a plurality of hollow spaces 6 that are connected to each other and form an interconnected cavity network.

Cylindrical wall or housing 1 and the porous elements 5 are non-detachably connected to one another and are made from steel or titanium.

If the reactor is for example designed to carry out hydrogenation reactions, the tube 1 has preferably an inner-diameter which is in the range of from 2 to 100 mm.

The porosity $\epsilon$ of the two porous elements 5 is between 0.8 and 0.95.

The hollow spaces 6 of the at least one porous element are substantially sphere-shaped and have an average diameter of 2 to 5 mm. Furthermore, the metallic shell defining the sphere-shaped hollow spaces 6 additionally comprises a plurality of holes 7 which allow cross flow of the material, wherein the average diameter of said holes is in the range of 0.5 to 1 mm.

Another metallic or non-metallic shell or framework which defines the hollow spaces 6 and holes 7 of the porous elements 5 is exemplified in FIG. 4. It is consisting of a plurality of cross-wise linked bars 8. In a special embodiment of the invention, these bars 8 comprise a hollow structure consisting of interconnected channels which dependent on the specific use may act as a further heat exchange system.

The cylindrical housing 2 of the reactor shown in FIG. 1 further comprises a double-walled cylindrical wall defining an annular chamber 9, wherein said annular chamber 9 includes a fluid inlet 10 and fluid outlet 11 which are connected to a heat exchanger for continuously transporting a heat exchange fluid through said chamber 9.

Finally, the reactor comprises a central inner-tube 12 which is arranged in longitudinal direction of the cylindrical wall 2, wherein said inner tube 12 includes one outlet 13 for adding at least one compound to the reaction medium transported through the tube 1.

In another preferred embodiment of the invention, catalyst particles are attached on the surface of the metallic shell. The type of catalyst usable according to the invention is dependent on the reaction for which the reactor is intended. In accordance with hydrogenation reactions described herein preferred catalysts are selected from the group consisting of Pt-catalysts, Pd-catalysts, Ni-catalysts and oxides of transition metals, as for example Pd, $Pd(OH)_2$, Pd/C, $Pd/BaSO_4$, $Pd/CaCO_3$, $Pd/Al_2O_3$, Pt, $PtO_2$, Ni, Raney Ni and Ru.

2. Manufacturing of a Plug Flow Reactor

In terms of chemical reactions in metal foamy structures some difficulties of commercially available foams had to be solved. On one hand, commercially available material, like aluminum or copper, is critical for chemical reactors, especially in terms of corrosion. On the other hand, the connection from the foam to the wall which is a limiting step in the heat transfer. Different approaches like soldering were tested but no persistent connection was achieved. Therefore and in accordance with the present invention a new manufacturing approach is proposed, which is the so called laser sintering technique (SLS), as described in the introduction. With this technology, a three-dimensional structure of nearly every shape can be designed in a Computer Assisted Design (CAD) software and than manufactured as one single part. This is done by depositing a layer of metal powder, directing energy on a selected position corresponding to the CAD model to sinter it before depositing a new layer and begin the procedure again as it is for example described in U.S. Pat. Nos. 5,639,070, 5,732,323 and 6,676,892. Because the manufacturing process has nearly no limitation in terms of geometry up to a length scale in the order of 50 µm every process specific design criteria can be fulfilled by the manufacturer. These preferences allow very precise scaling for chemical processing by adapting the most influential parameters listed in the following. An alternative approach would be the so called Electron Beam Melting (EBM) process which is also described in the introduction.

3. Residence Time

The residence time is an important parameter for the layout design of chemical reactors. In the chemical and pharmaceutical industry discontinuous batch processes are still common. The scale up process from laboratory scale is therefore straight forward in terms of heat and mass transfer. The big advantage of such plants is their high flexibility in production and stable product quality over a batch cycle. But in case of malfunction huge amount of educts get lost. The residence time in such vessels can be controlled very easily. If one want to scale a continuous system, a reactor has to be designed (e.g. plug flow reactor) which guarantees very sharp residence time distributions. This can be simply realized by the insertion of metal foam according to the invention into a tube. The inventors compared conventional and sintered metal foam with the characteristics of fixed beds and common packing material. The results show a similar behavior.

Compared to fixed bed reactors the porosity of metal foam is much higher (in the range of 90%). This leads to smaller pressure drops and therefore less operating costs.

4. Heat Transfer Properties

Metal foams are already used in the heat exchanger technology to enhance the effectiveness of the heat transfer.

The heat transfer in metal foams was investigated in more detail and in view of chemical reactions and it has been noted that a critical issue for an optimized heat flux is the connection of the foam to the wall.

Conventional foam is inserted into heat exchangers by force fitting. This technique allows a fast adaptation of given heat exchangers to enhance their efficiency. Therefore normally copper or aluminum alloys are used. This leads not only to contact corrosion problems it depicts also a limitation in heat transfer. Different approaches were applied to overcome this problem, e.g. gluing or soldering, but all of them are very circumstantial. Neither of those technologies deals with the manufacturing of the heat exchanger, reactor walls respectively and the foam structure within, as one single part. The application of SLS according to the present invention offers the possibility to manufacture heat exchanger reactors which are stable enough to run reactions even at high temperatures and pressures.

5. Mixing Properties

In order to compare the mixing efficiency of metal foam to conventional systems the coefficient of variation for different pore sizes was analyzed in a range of Reynolds numbers from 600 to 7600 based on the empty tube diameter.

Values as low as 0.1 were observed after a very short mixing length of 5 cm. The inventors could show that there is an optimum in pore size of the metal foam for mixing properties. This optimum is affected by the turbulence induced by the structure. Therefore the shape of the inner structure, i.e. of the porous elements in accordance with the present invention can be optimized by applying Computational Fluid Dynamics software (CFD-software) in combination with the sintering process.

6. Example of a Device Showing Intensified Heat and Mass Transfer Properties

This example presents a continuous plug flow reactor concept for the handling of exothermic multiphase reactions. The main features of the device are the fast mixing of different educts of different states of matter and a fast heat transfer rate. Thereby flow rates in the production scale of kg/min can be achieved at a comparable small pressure drop. By Selective Laser Sintering (SLS) the reactor was constructed as one single part with integrated porous media designed in CAD (computer assisted design).

The inner geometry of the reactor was modelled on the shape of commercial metal foam which was found to be a very good static mixer. The structure is the negative pattern of tetrahedral arranged overlapping spheres with a diameter of 2.9 mm. It has a very high specific surface in the order of $10^4$ $m^2/m^3$ combined with a high porosity of about 85%. This micro-structured geometry has excellent heat and mass transfer properties.

6.1. Characterisation of Single Phase Flow Through the Device by Using Water as Model Fluid All investigations were performed for a range of Reynolds numbers from 600 to 7600 based on the empty tube diameter.

Radial mass transfer: Simultaneous Particle Image Velocimetry (PIV) and Laser Induced Fluorescence (LIF) measurements were performed in orthogonal planes normal to the radial and axial direction downstream of a foam element of 50 mm length and a diameter of 7 mm. Commercial Metal Foams of different pore sizes (20, 30 and 45 pore per inch) and our designed structure were investigated and compared to the empty tube reference case. The mean flow field is clearly distorted by the metal foam. As a consequence the radial dispersion of a tracer dye, injected in front of the foam elements, is strongly increased. This leads to an enhanced mixing efficiency, quantified by the coefficient of variation. Coefficients of variation in the order of 0.1 were achieved.

Axial mass transfer: The big share in radial velocity components contributes to very narrow residence time distributions. The measured dispersion characteristics are similar to those of packed beds and common packing materials at strongly decreased pressure drops and comparable specific surface areas.

Heat transfer: The convective heat transfer is strongly increased by the inserted metal foam elements. A higher heat transfer rate for the foam of 20 ppi was observed compared to the 30 ppi foam. This can be explained by the increased turbulence induced by the foam structure with bigger pores. Absolutely best performance was observed for the sintered reactor which has a bigger specific surface and a fixed connection to the wall.

6.2. Characterisation of Multiphase Flow

In the following, the characterisation (holdup, temporal statistics) of a water-air flow through the sintered structured element and conventional metal foam for different mass flow rates by means of optical measurements and the application of a wire mesh sensor within a tube (inner diameter 7 mm) is presented.

In the experimental setup, an electrode-mesh tomograph is placed at the inlet and outlet of a foam element. The device enables a high-speed visualization of transient gas fraction distributions in two phase flows in pipes. It consists of two electrode grids. The two planes of wire grids are placed into the flow in a short distance from each other. The angle between the wires of both grids is 90°. The wires of the first plane (transmitter plane) were supplied with pulses of a driving voltage.

If the pulse, given to one of the transmitter wires, arrived at a certain wire of the second plane (receiver plane), it is assumed that the crossing point between the two selected wires is occupied by the conducting phase (water). With a CCD camera the flow was simultaneously observed from the side. By this the influence of the sensor on the flow pattern and the inlet flow field were characterised. The results show a very homogeneous dispersion of the gas phase with a narrow bubble size distribution over the cross section of the tube at the reactor outlet.

The presented continuous plug flow reactor was found to be a very interesting alternative system to semi batch processes. The applied manufacturing method allows building nearly any shape which leads to a high flexibility of the modular reactor concept.

7. Examples of Reactions which can be Carried out with a Reactor in Accordance with the Invention The intermediate which may be hydrogenated in a reactor according to the invention is preferably selected from the group consisting of organic azides and organic peroxides compounds which are hereinafter defined as follows:

7.1. Azide Intermediates

For preparing an organic azide as intermediate an organic compound suitable to react with $N_3$—, is used as starting compound and reacted with $N_3$—.

The introduction of the azido function can take place for example by addition of the azide reagent to a suitable unsaturated organic compound, or by substitution of a leaving group, e.g. a halogen atom, a hydroxy-group, optionally activated in situ with diethyl azodicarboxylate/triphenylphosphine (Mitsunobu conditions), an acyloxy-group, or a sulfonyloxy function in an organic compound suitable for reaction with $N_3$—, or by ring opening of optionally substituted oxiranes or aziridines.

Azide Reagents:

$N_3$— may be used in any form known to the person skilled in the art.

For example, the azido function may be introduced using an azide reagent selected from the group consisting of $HN_3$; alkali azides like $NaN_3$, $LiN_3$ and $KN_3$; quarternary ammonium azide, like tetrabutylammonium azide; azido-trimethylsilan; halogen azides, like chloro-, bromo- or iodo azide; and the like. Optionally, also a proton source is present during the reaction with $N_3$—. Examples of proton sources include ammonium chloride.

Preferred azide reagents are alkali azides like $NaN_3$, $LiN_3$ and $KN_3$, which may optionally be combined with ammonium chloride.

Substrates

Suitable substrates for the introduction of the azide function by substitution are organic compounds of the general formula R-L, wherein R stands for an optionally substituted alkyl group and L is a leaving group.

The alkyl group may be linear, branched or cyclic and preferably has 1 to 20 C-atoms. The chain may also include one or more heteroatoms selected from the group consisting of N, S and O.

Suitable examples of a leaving group L include a halogen atom, like Cl, Br or I; a hydroxy-group, optionally activated in situ with diethyl azodicarboxylate/triphenylphosphine (Mitsunobu conditions); an acyloxy-group; or a sulfonyloxy-group, like trifluormethansulfonyloxy, methanesulfonyloxy, benzenesulfonyloxy, p-toluenesulfonyloxy or m-nitrobenzenesulfonyloxy. Preferably the leaving groups L in R-L are halogen, for example Cl or Br, or sulfonyloxy-groups.

Suitable substrates for the introduction of the azide function by ring-opening are optionally substituted organic compounds containing an oxirane or aziridine.

Especially interesting are enantiomerically enriched substrates in which a halogen atom, a hydroxy-group or a sulfonyloxy-group can be substituted by azide with inversion of configuration, or enantiomerically enriched substrates in which an oxirane or aziridine that can be stereoselective and regioselective ring-opened by azide. For example, the stereo- and regioselective oxirane ring-opening of ethyl (3R,4S,5S)-4,5-epoxy-3-(1-ethylpropoxy)-cyclohex-1-ene-1-carboxylate with sodium azide.

Suitable substrates for the introduction of the azide function by addition reaction are optionally substituted unsaturated organic compounds, for example optionally substituted alkenes or alkynes. A specific class of alkenes are those having an electron-withdrawing substituent, like a nitrile, carboxylic acid ester, nitro, ketone or aldehyde group, susceptible for 1,4-addition of alkali azides.

These organic compounds may be linear, branched or cyclic with 2 to 30 C-atoms in the chain, may contain a combination of reactive functions and may also include one or more heteroatoms selected from the group consisting of N, S and O.

Substituents

The organic compounds may optionally be substituted with one or more substituents preferably selected from the group consisting of an optionally substituted C1-C6-(cyclo)alkyl, C1-C6-(cyclo)alkenyl, C1-C6-(cyclo)alkynyl, an optionally substituted C1-C10-(hetero)aryl, an amine, acylamido, nitro, carboxylic acid, carboxylic acid ester, carboxamide, nitrile, an oxo group, like an aldehyde or a ketone, a hydroxy, an alkoxy group, and the like.

The organic compounds may further be fused with an optionally substituted alkane ring, C5-C20-aryl or C4-C20-heteroaryl compounds.

Examples of suitable substituents for the alkenyl, alkynyl and/or (hetero)aryl groups include the above mentioned substituents and halogen atoms.

Examples of suitable organic compounds include 4-methyl-pent-3-en-2-one, acrolein, 2-methyl-2-pentene, cyclohexen-2-enone, 5-cholestene, 2-isopropenyl-5-methyl-cyclohexanol, cyclohexene-epoxide, styrene epoxide, ethyl (3R,4S,5S)-4,5-epoxy-3-(1-ethylpropoxy)-cyclohex-1-ene-1-carboxylate, ethyl (3R,4R,5R)-4,5-imino-3-(1-ethylpropoxy)-cyclohex-1-ene-1-carboxylate, 1-phenylethanol, 1-phenylethanol p-tosylate ester, 3-phenylpropan-1 ol-mesylate ester, 4-phenylbutan-2-ol mesylate ester, (1-bromo-ethyl)benzene, (1-chloro-ethyl)benzene.

Hydrogenation

The azide intermediate is transformed, i.e. reduced by catalytic hydrogenation into an amine.

Suitable reducing agents include hydrogen gas or formic acid, optionally as mixtures with substituted amines like triethylamine or hydrazine in the presence of a preferably immobilized heterogeneous hydrogenation catalyst, hydride reducing reagents like $NaBH_4$, $LiAlH_4$, or reduction with diimide, or reduction with a suitable trialkyl- or triarylphosphine, like trimethylphosphine or triphenylphosphine (Staudinger reaction).

The hydrogenation pressure is 0.05-10 MPa, preferably 0.1-0.5 MPa, the reaction temperature is in a range from 10 to 200° C., preferably 15 to 100° C.

For carrying out hydrogenation of azide intermediates as exemplified above, it will be understood that in order to optimize the process, the design of the reactor according to the invention, i.e. the reactor volume, the number of plates 3 or layers of catalysts 11 may vary dependent on the substrates and volumes thereof used in the specific application.

7.2. Peroxo Intermediates

In a second embodiment, the intermediate is a peroxo compound, like an organic peroxide R—OO—R.

The intermediate organic peroxide or hydroperoxide can be prepared for example by the following reactions:

reaction of an alkyl halide, alkyl sulfate or alkyl sulfonate with sodium peroxide (R—OO—R)

reaction of an organometallic compound (for example, R—MgX, R—Li) with oxygen reaction of an alkane having a reactive C—H with oxygen (autoxidation)

reaction of an alkene with singlet oxygen reaction of a diene with singlet oxygen (cyclic peroxide)

reaction of an alkene or aromatic compound with ozone in a solvent

Preferred reaction types are the reaction of an alkene or aromatic compound with ozone in a solvent, the reaction of an alkane having a reactive C—H with oxygen, or the reaction of an alkene with singlet oxygen.

Suitable alkenes or aromatic compounds for the reaction with ozone or with singlet oxygen are optionally substituted unsaturated organic compounds. These organic compounds may be linear, branched or cyclic with 2 to 30 C-atoms in the chain, may contain a combination of reactive functions and may also include one or more heteroatoms selected from the group consisting of N, S and O.

Substituents

The organic compounds may be optionally substituted with one or more substituents selected from the group consisting of optionally substituted C1-C6-(cyclo)alkyl, C1-C6-(cyclo)alkenyl, C1-C6-(cyclo)alkynyl, an optionally substituted C1-C10-(hetero)aryl, an amine, acylamido, nitro, carboxylic acid, carboxylic acid ester, carboxamide, nitrile, an oxo group, an aldehyde, a hydroxy, an alkoxy group, and the like.

Examples of suitable substrates include naphthalene, furane, butadiene, cyclohexene, cyclooctene, cyclooctadien, vinyl pyridine, methyl methacrylate, maleic acid anhydride, pinene, α-terpinene, citronellol, isopropylbenzene.

Singlet oxygen can be generated in a photochemical method by irradiation of molecular oxygen in the presence of a photosensitizer. Singlet oxygen can also be generated by non-photochemical methods as for example from hydrogen-peroxide and NaOCl or sodium molybdate, or from ozone and $(PhO)_3P$.

Hydrogenation

In case of a peroxo intermediate the organic peroxide may be reduced into an end product (alcohol, aldehyde or ketone) by hydrogenation in the presence of a suitable heterogeneous catalyst (Raney Ni, Pd—C, Pd—BaCO$_3$, Pt, PtO$_2$, etc.).

In case of hydrogenation the reaction pressure is for example 0.05-10 MPa, preferably 0.1-0.5 MPa, the reaction temperature is in a range from 10 to 200° C., preferably 15 to 100° C.

For carrying out hydrogenation of peroxide intermediates as exemplified above, it will be understood that in order to optimize the process, the design of the reactor according to the invention, i.e. the reactor volume, the number of plates 3 or layers of catalysts 11 may vary dependent on the substrates and volumes thereof used in the specific application.

8. Selective Hydrogenation of Terminal Triple Bonds

A reactor as specified herein above may be used for the selective hydrogenation of terminal C≡C triple bonds to terminal C═C double bonds in the presence of the following functional groups:

alkyl: linear $C_{1-50}$ alkyl, branched $C_{3-50}$ alkyl, $C_{3-20}$ cycloalkyl, as well as alkylcycloalkyls and cycloalkylalkyls with 1 to 50 C-atoms; preferred are $C_{1-20}$ alkyl—may it be linear ($C_{1-20}$), branched ($C_{3-20}$) or cylic ($C_{3-20}$) or an alkylcycloalkyl ($C_{4-20}$) or a cycloalkylalkyl ($C_{4-20}$);

alkenyl: linear $C_{2-50}$ alkenyl, branched $C_{3-50}$ alkenyl; preferred are $C_{2-20}$ alkenyl—may it be linear ($C_{2-20}$) or branched ($C_{3-20}$);

heteroalkyl: i.e. non-aromatic carbon hydrogen moieties, preferred saturated carbon hydrogen moieties with 3 to 50 C atoms (preferably 3 to 30 C atoms) comprising one or more of the heteroatoms nitrogen and/or oxygen, such as ethers e.g. tetrahydrofuran and tetrahydropyran;

alkylaryl and aryl such as phenyl, tolyl, xylyl, mesityl, naphthyl etc., preferably having 6-17 C atoms;

heteroaryl, preferably having 5-17 C atoms, whereby the heteroatom is either oxygen or nitrogen; the heteroaryl may also contain several heteroatoms (number of heteroatoms ≥1), so that also heteroaryl are encompassed which contain O atoms as well as N atoms; examples are pyridyl, indyl, furyl;

hydroxy (—OH);

nitrooxy (—NO$_2$);

amino (—NH$_2$);

SiR$^1$R$^2$R$^3$, wherein R$^1$, R$^2$ and R$^3$ are independently from each other alkyl (linear or branched $C_1$-$C_6$) or aryl or alkylaryl; preferably R$^1$=R$^2$=R$^3$.

That means alkines RC≡CH are hydrogenated to alkenes RHC═CH$_2$, whereby R is a carbon hydrogen moiety optionally bearing a heteroatom O and/or N or several of them and/or the following functional groups as defined above: —OH, —NO$_2$, —NH$_2$, and —SiR$_3$. Preferably R is selected from the group consisting of alkyl, alkenyl, aryl, alkylaryl, heteroaryl,—as defined above—which all may further bear one or more heteroatoms O and/or N, or further functional groups such as —OH, —NO$_2$, —NH$_2$, and —SiR$_3$. Preferably the alkines are precursors of isoprenoid building blocks.

In general the hydrogenation may be carried out at a temperature in the range of from 0° C. to 150° C. and/or at a pressure in the range of from 1 bar to 150 bar.

The invention claimed is:

1. A device for carrying out selective hydrogenation of azide and peroxide compounds under homogenous and heterogeneous conditions comprising:

a tubular housing which comprises a reaction tube having a wall with at least one inlet end and at least one outlet end to allow for transport of reaction medium comprising azide or peroxide compounds through the reaction tube between the inlet and outlet ends thereof, at least one porous element positioned between the inlet and outlet ends of the reaction tube, wherein the at least one porous element consists of a solid foamy structure, wherein the reaction tube and the at least one porous element are a one-piece structure, and wherein the at least one porous element has a porosity ϵ between 0.6 and 0.95 and comprises a framework of interconnected elements establishing a plurality of shells respectively defining a plurality of hollow spaces having a substantially sphere-shaped geometrical configuration with an average diameter of 1 to 20 mm, the plurality of hollow spaces being arranged in an array whereby an individual hollow space is bounded by a plurality of adjacent hollow spaces, and wherein the shells include a plurality of substantially circular holes each having an average diameter of 0.01 to 5 mm that fluid-connect the plurality of adjacent substantially sphere-shaped hollow spaces of the porous element to thereby form an interconnected network that allows cross-flow of the azide or peroxide compounds of the reaction medium through the substantially sphere-shaped hollow spaces of the porous element as the reaction flows between the inlet and outlet ends of the reaction tube.

2. The device according to claim 1, further comprising a central inner tube positioned longitudinally within the reaction tube and extending through the at least one porous element, wherein the central inner tube includes a discharge outlet to allow for the addition of at least one other compound to the reaction medium within the reaction tube.

3. The device according to claim 2, wherein the catalyst particles are selected from the group consisting of Pt-catalysts, Pd-catalysts, Ni-catalysts and oxides of transition metals, as for example Pd, Pd(OH)2, Pd/C, Pd/BaSO4, Pd/CaCO3, Pd/Al2O3, Pt, PtO2, Ni, Raney Ni and Ru.

4. The device according to claim 1, wherein the reaction tube and the at least one porous element are a one-piece structure formed of a metal, and wherein the metallic shells of the at least one porous element comprise hydrogenation catalyst particles immobilized on surfaces thereof for catalyzing the hydrogenation of the azide or peroxide compounds in the reaction medium.

5. The device according to claim 1, wherein the shells have a surface that is at least partially smooth, at least partially rough or a combination of at least partially smooth and rough.

6. The device according to claim 1, wherein the at least one porous element provides a flow of the reaction medium in the reaction tube having a Reynolds number of between 1 and 100,000.

7. The device according to claim 1, wherein the tube and the at least one porous element are a one-piece structure made from a metal selected from the group consisting of iron, titanium, zirconium, hafnium, vanadium, niob, rare earths and tantalum, or a metal alloy made from combinations thereof.

8. The device according to claim 1, wherein the tube and the at least one porous element are a one-piece structure made from a ceramic material.

9. The device according to claim 8, wherein the ceramic material is selected from the group consisting of aluminum oxide, silicon oxide, zirconium(IV) oxide, cordierite, steatite.

10. A method for selective hydrogenation of azides and peroxide compounds by a continuous gas-, liquid, gas-liquid, solid-gas, solid-liquid or solid-liquid-gas reaction, the method comprising passing a reaction medium comprising an azide or a peroxide compound to be hydrogenated through the reaction tube of the device according to claim 1 under selective hydrogenation conditions for the azide or peroxide compounds in the reaction medium.

11. The method according to claim 10, wherein the reaction tube and the at least one porous element are a one-piece structure formed of a metal, and wherein the metallic shells of the at least one porous element comprises hydrogenation catalyst particles immobilized on surfaces thereof for catalyzing the selective hydrogenation of the azide or peroxide compounds in the reaction medium.

12. The method according to claim 11, wherein the catalyst particles are selected from the group consisting of Pt-catalysts, Pd-catalysts, Ni-catalysts and oxides of transition metals, as for example Pd, Pd(OH)2, Pd/C, Pd/BaSO4, Pd/CaCO3, Pd/Al2O3, Pt, PtO2, Ni, Raney Ni and Ru.

13. The method according to claim 11, which further comprising mobilizing solid hydrogenation catalyst particles in the reaction media.

14. The method according to claim 13, wherein the mobilized solid catalyst particles are selected from the group consisting of Pt-catalysts, Pd-catalysts, Ni-catalysts and oxides of transition metals, as for example Pd, Pd(OH)2, Pd/C, Pd/BaSO4, Pd/CaCO3, Pd/Al2O3, Pt, PtO2, Ni, Raney Ni and Ru.

* * * * *